United States Patent [19]

Nakase et al.

[11] Patent Number: 4,990,929

[45] Date of Patent: Feb. 5, 1991

[54] MOTOR-DRIVEN AUTOMOBILE ANTENNA WITH TIMER CIRCUIT

[75] Inventors: Kazuhiko Nakase, Tokyo; Yuzo Yamamoto, Kanagawa, both of Japan

[73] Assignee: Harada Kogyo Kabushiki Kaisha, Tokyo, Japan

[21] Appl. No.: 285,050

[22] Filed: Dec. 15, 1988

[51] Int. Cl.[5] .................... H01Q 1/320; H01Q 1/100; G05B 19/310

[52] U.S. Cl. .................................. 343/715; 318/603; 343/903

[58] Field of Search .............. 343/715, 900, 903, 901; 318/603, 266, 468, 434, 563; 388/815, 822; 307/9.1, 10.1

[56] References Cited

U.S. PATENT DOCUMENTS

| | | | |
|---|---|---|---|
| 3,843,913 | 10/1974 | Schaub et al. | 388/822 |
| 4,337,424 | 6/1982 | Cap et al. | 388/815 |
| 4,506,266 | 5/1985 | Mizuno et al. | 343/903 |
| 4,514,670 | 4/1985 | Fassel et al. | 318/266 |
| 4,730,152 | 3/1988 | Foust et al. | 318/603 |
| 4,733,101 | 3/1988 | Graham et al. | 343/903 |
| 4,839,570 | 6/1989 | Saganovsky | 388/815 |

FOREIGN PATENT DOCUMENTS

| | | | |
|---|---|---|---|
| 2832061 | 1/1980 | Fed. Rep. of Germany | 343/903 |
| 0013803 | 2/1981 | Japan . | |
| 2187597 | 9/1987 | United Kingdom . | |

*Primary Examiner*—Rolf Hille

*Assistant Examiner*—Peter Toby Brown

*Attorney, Agent, or Firm*—Koda and Androlia

[57] ABSTRACT

A motor-driven automobile antenna equipped with a timer which stops a motor for extending and retracting a rod antenna via a rack rope after a lapse of time which is longer than the period of time required by the antenna to be fully extended or retracted.

5 Claims, 3 Drawing Sheets

MOTOR-DRIVEN AUTOMOBILE ANTENNA WITH TIMER CIRCUIT

BACKGROUND OF THE INVENTION

1. Field of the Invention

The present invention relates to motor-driven antennas for automobiles.

2. Prior Art

In conventional motorized antennas for automobiles, a rack rope, attached to the lower end of a rod antenna, is moved in a vertical direction by gears which are driven by a motor. In addition, a clutch is used between the motor for driving the antenna and the rack rope in order to minimize damage to other components such as the rack rope when the rod antenna is locked.

In prior art antennas, when the power of the automobile radio is turned on, the motor for the antenna starts to rotate, and the rod antenna is extended gradually. When the antenna reaches its maximum length, it is mechanically locked. When the rod antenna is thus locked, the current in the motor increases. Based upon such increased motor current level, the locking of the antenna is detected. At this moment, the clutch is disengaged, thereby interrupting the electric current to the motor.

In the above-described conventional apparatus, locking of the antenna is detected based on the electric current flowing to the motor. However, if a malfunction occurs in the circuit which detects the motor current, the clutch continues to operate while being disengaged emitting a clacking noise. Furthermore, the motor wastes power during the period when the clutch is disengaged.

SUMMARY OF THE INVENTION

In view of the above-described conventional apparatus and in order to solve the problems thereof, the present invention employs a timer which forcibly shuts down and stops the motor after a lapse of a predetermined time period i.e. the time period required for the rod antenna to be fully retracted or extended.

Thus, the motor is forced to shut down or is stopped after a certain period of time has elapsed. Accordingly, even if a malfunction occurs in the circuit which detects the motor current, such malfunction will not affect the clutch, and the timer stops the motor and the clutch. Thus, continuous disengagement of the clutch and the subsequent development of clacking noises are avoided. In addition, waste of electrical power by the motor is prevented.

DETAILED DESCRIPTION OF THE INVENTION

Figure 2:
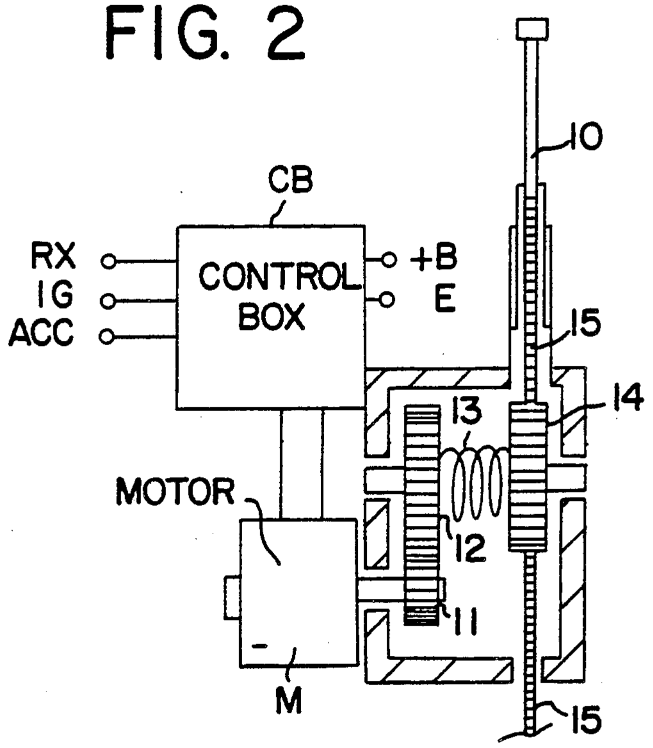
FIG. 2 is an explanatory diagram of the circuit of FIG. 1.

In FIG. 2, the lower end of the innermost periphery of a rod antenna 10 which can be freely extended or retracted is connected to the upper end of a rack rope 15 which is meshed with an antenna gear 14. In reality, the rack rope 15 is longer than that shown in the FIG., but its lower section is omitted therein.

A motor gear 11 fixed on the rotating axle of a motor M meshes with an intermediate gear 12, and a spring 13 which acts as a shock absorber is provided between the gears 12 and 14. A control box CB includes a control circuit which controls the rotation of the motor M.

The rack rope 15 and gear 14 is described as an example of a mechanism which makes the rod antenna 10 move vertically, and the motor M is an example of a means which drives such a vertical motion mechanism. The spring 13 is described as an example of a shock absorber which absorbs mechanical shocks between the vertical motion mechanism and the motor M.

Figure 3:
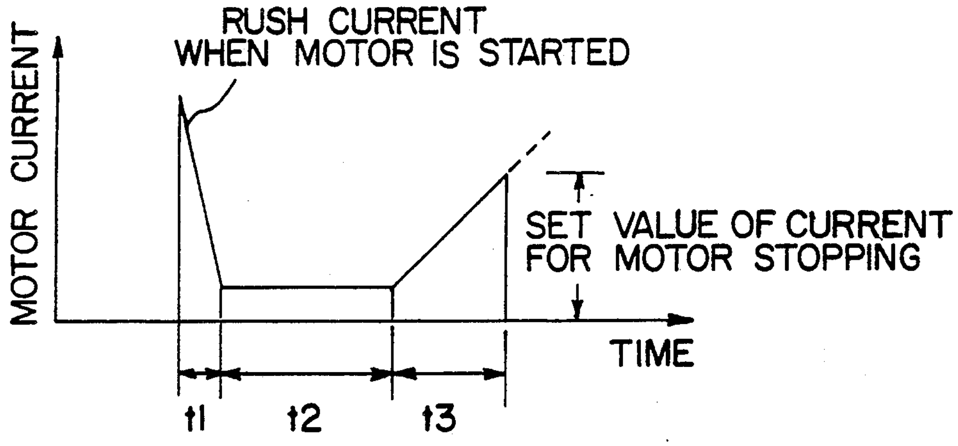
FIG. 3 shows changes in the motor current in the embodiment.

FIG. 3 shows the flow of electric current between the time the motor M is activated and the time the antenna is locked and the operation of the motor M ends.

Figure 1:
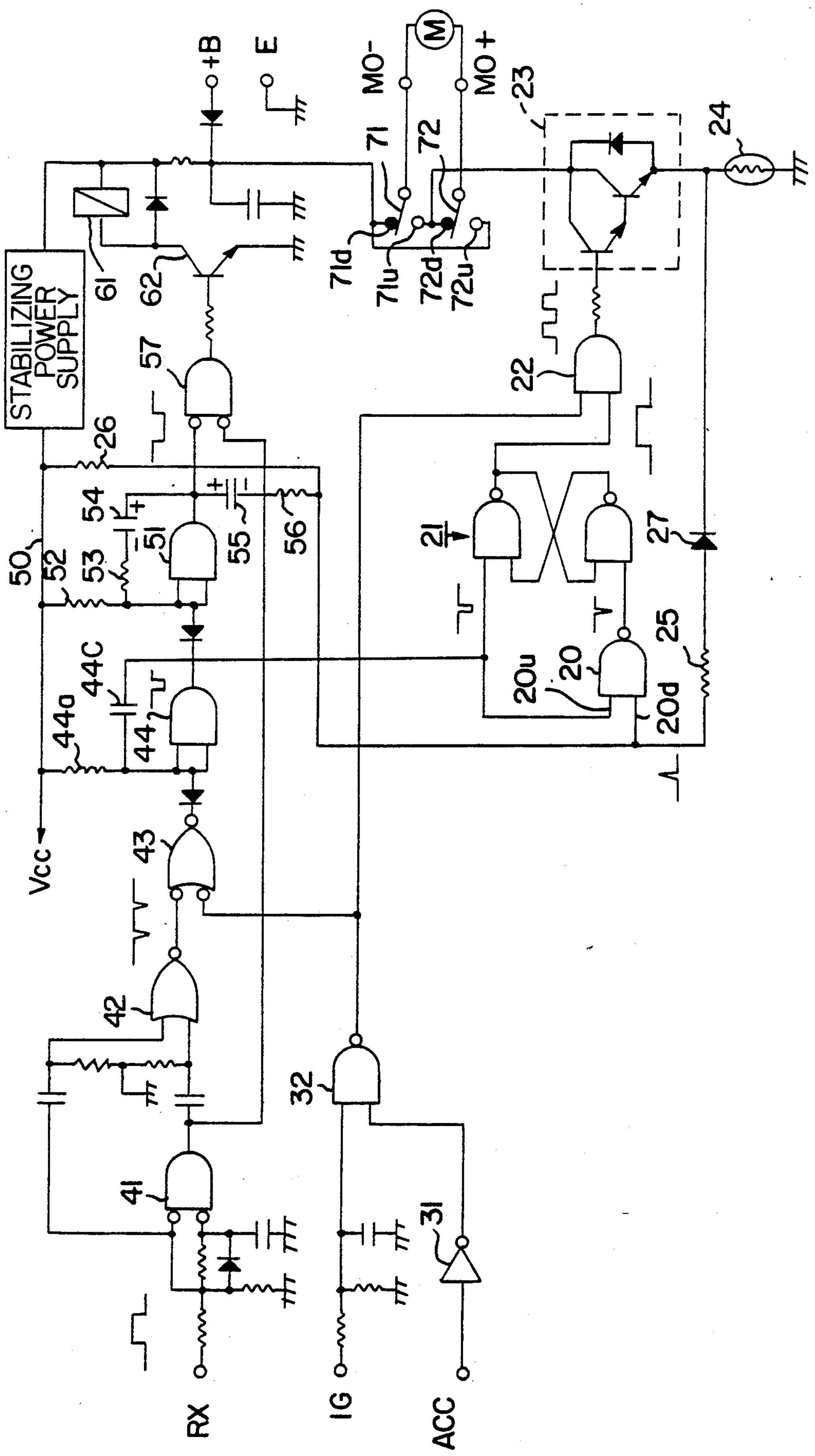
FIG. 1 shows an example of a control circuit in the motor-driven automobile antenna of the present invention.

FIG. 1 shows an example of the control circuit provided in the control box CB. This control circuit includes a NAND gate 20, an R-S flip-flop 21, and an AND gate 22. The AND gate prevents a transistor block 23 from turning on. The transistor block 23 controls the driving of the motor M. The control circuit further includes a positive temperature-resistance element 24 (hereafter called "PTC") which is connected in series to the motor M. Resistors 25 and 26 in the control circuit adjust the bias at one of the input terminals of the NAND gate 20, and a diode 27 of the control circuit shifts the bias in a similar manner to those of the above-mentioned resistors.

The gates 20 and 22, flip-flop 21, and transistor block 23 constitute an example of a mechanism for shutting down and stopping the motor M when the current in the motor reaches a predetermined level. The PTC 24 is an example of a device which generates voltage which corresponds to that of the motor M.

The control circuit is also provided with an inverter 31 which inverts signals from the ACC, a NAND gate 32 which generates a signal "0" when the starter (ignition) is turned on, a gate 41, a NOR gate 42, and a gate 43.

The gate 41 has a delay mechanism which causes a delay when the signal changes from "0" to "1" and no delay when the signal changes from "1" to "0." The gate 41 also has a signal inverting mechanism. The output of the NOR gate 42 is negative pulses at the moment when the power of a receiver unit RX is turned on and/or off. The gate 43 is a monostable multivibrator and generates negative pulses (pulses of "0" signal) when the power of the receiver unit RX is turned on and/or off and at the start of the operation of a starter. The pulse width of such negative pulse is set at 0.1 second by a resistor **44*a* and a condenser 44*c*** (this pulse width may be set at any desired level).

A timer 50 includes resistors 52, 53 and 56, capacitors 54 and 55, and an AND gate 51. This timer 50 is an example of a timer which shuts down and stops the motor M through the aforementioned motor shutdown mechanism after a predetermined period of time which is required for the rod antenna 10 to be fully retracted from its maximum length or fully extended from its minimum length.

A gate 57 brings a transistor 62 to an ON state after the power of the receiver unit RX is switched on and only within the time set by the timer 50. The transistor 62 activates a relay 61.

Contacts 71 and 72 of the contact relay 61 are connected to terminals 71*u* and 72*u*, respectively, when the relay 61 is excited, which allows the motor M to rotate in a positive direction and raises the rod antenna 10. When the relay 61 is not excited, the contacts 71 and 72 are connected to terminals 71*d* and 72*d*, respectively, causing the motor M to rotate in a reverse direction and lower the rod antenna 10.

The transistor 62 is an example of a switching means which activates the relay 61 for a period of time set by the timer 50.

Figure 4:
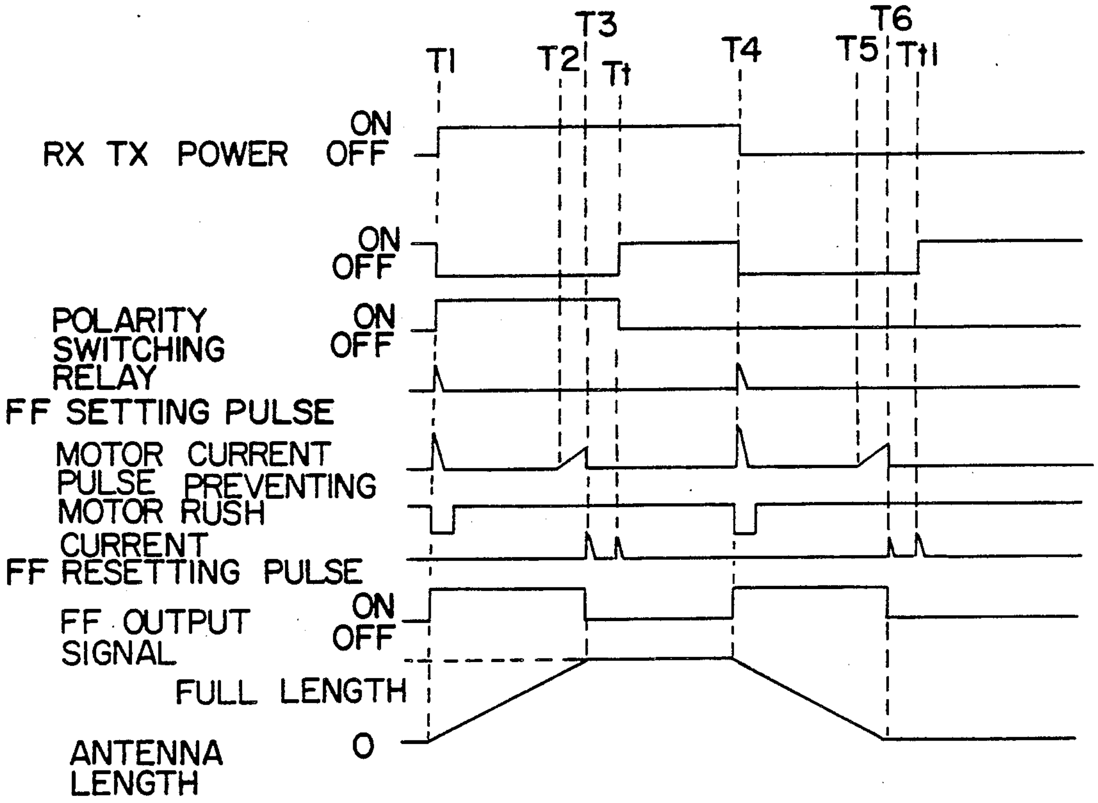
FIG. 4 is a time chart showing the action of a rod antenna of the embodiment.

The operation of the above-described embodiment is explained below as follows:

FIG. 4 is a time chart indicating the operation of the embodiment.

First, the power of the receiver unit RX is turned on at time T1, and the gates 42 and 43 generate negative pulses. Thus, the AND gate 44 generates negative pulses for 0.1 second. This causes the flip-flop 21 to be set, and the flip-flop 21 generates a positive signal. If the starter is not operating at this moment, the gate 32 outputs a positive signal, causing the AND gate 22 to output a positive signal. Thus, the transistor block 23 is turned on, and the motor M starts to rotate.

The timer 50 outputs a negative signal during its set-time and outputs a positive signal when it is not in the set-time. The set-time starts at T1, and at T1, the timer 50 outputs a negative signal, and the gate 41 outputs a negative signal. Thus, at T1 when the power of the receiver unit RX is on, the output of the gate 57 is also positive, turning on the transistor 62. At this moment, the relay 61 is excited, the contacts 71 and 72 are connected to the terminals 71*u* and 72*u*, respectively, the motor M starts to rotate in a positive direction, and the rod antenna 10 starts to be extended.

At the time the motor M starts to rotate, a rush current (a current generated during t1 as shown in FIG. 3) enters the motor M. At this moment, the voltage at both ends of the PTC 24 rises over a predetermined level, and the voltage at one terminal 20*d* of the NAND gate 20 exceeds the threshold. Accordingly, the NAND gate 20 tends to output a negative signal. However, since a negative pulse has already been applied to the other input terminal 20*u* for 0.1 second, the NAND gate 20 does not output a negative signal, and the flip-flop 21 is not reset.

In this way, the rod antenna 10 is slowly extended. In other words, the motor M continues to rotate in a positive direction (for the period t2 as shown in FIG. 3). When the rod antenna 10 is extended near its maximum (at T2 of FIG. 4), the gear 14 slows down in preparation for stopping. From this point, the spring 13 acts as a shock absorber, and the rotation speed of the gears 12 and 11 and the motor M gradually begin to decrease, while the motor current gradually increases (at the period t3 shown in FIG. 3). Thus, the voltage at both ends of the PTC 24 rises gradually and exceeds the predetermined level at T3 (FIG. 4), while the voltage at the input terminal 20*d* of the AND gate (logic) 20 exceeds the threshold. At this moment, a positive signal is applied to the input terminal 20*u* of the AND gate 20, which outputs a negative signal, thus the flip-flop 21 is reset.

As a result, the AND gate 22 outputs a negative signal, and the transistor block 23 is turned off, and at this moment the motor M stops.

If the rod antenna 10 is locked and a malfunction occurs such as the value of the resistance of the PTC 24 being fixed much lower than the original level, the voltage at the input terminal 20*d* of the NAND gate 20 fails to reach the predetermined level, and the motor M is unable to stop. In such circumstances, however, the timer 50 sends a positive signal after the set-time of the timer 50 has passed (at Tt), the flip-flop 21 is reset, the transistor block 23 is turned off, and the motor M stops.

If the power of the receiver unit RX is turned off thereafter (at T4 in FIG. 4), the gate 43 generates a negative pulse. For 0.1 second following the generation of this negative pulse, the gate 44 also generates a negative pulse. As a result, the flip-flop 21 is set again, turning on the transistor block 23. At this moment, since the power of the receiver unit RX is off, the gate 41 outputs a negative signal. Therefore, the transistor 62 is turned off, the relay 61 is not excited, and the contacts 71 and 72 are connected to the terminals 71*d* and 72*d*, respectively, and the motor M rotates in a reverse direction. As a result, the rod antenna 10 is gradually retracted. The timer 50 starts the set-time at T4.

When the rod antenna 10 approaches the minimum length (at T5 in FIG. 4), the gear 14 begins to be locked mechanically. At this moment, the spring 13 again serves as a shock absorber, and the speed of rotation of gears 12 and 11 and the motor M are gradually reduced. As a result, the current flowing through the motor M gradually increases, and the voltage at both ends of the PTC 24 begins to rise. When the voltage at these ends exceeds a predetermined level (at T6 of FIG. 4), the NAND gate 20 generates a negative pulse, the flip-flop 21 is reset, the transistor block 23 is turned off, and the motor M stops.

If a malfunction develops in the circuit which detects the motor current when the rod antenna 10 is locked and it is at the minimum length under the above circumstances, the timer 50 outputs a positive signal after lapse of the set-time (at Tt1). Thus, the flip-flop 21 is reset, the transistor block 23 is turned off, and the motor M is forced to shutdown or stop.

Shock absorbers of a type other than the spring 13 mentioned above may be used in this apparatus, or a clutch may be used instead of a shock absorber.

As described above, even if a malfunction occurs in the circuit which detects the motor current, the motor M which drives the rack rope is stopped after the set-time of the timer has lapsed. Accordingly, a clutch installed in the apparatus does not rotate without being engaged, eliminating noise from the clutch. In addition, unnecessary power is not wasted by the motor.

Also, since the transistor 62 activates the relay 61 for the length of the set-time of the timer 50, no power loss would occur outside of the set-time.

If the starter is turned on while the rod antenna 10 is being extended or retracted, the gate 32 generates a negative pulse. As a result, the gate 22 outputs a negative signal, the transistor block 23 is turned off, and the motor M, which is turning, is stopped.

When the starter is turned off, the AND gate 22 generates a positive signal. Thus, the transistor block 23 is turned on, the motor M continues to rotate, and the rod antenna 10 continues to be extended or retracted. At this moment, since the multi-vibrator 44 generates a negative pulse for approximately 0.1 second, the flip-flop 21 is set again and as described above, the transistor block 23 is turned on, the motor M starts to rotate, and the rod antenna 10 is extended or retracted. In other words, turning the power of the receiver unit RX on and/or off causes the rod antenna 10 to be extended and retracted.

A comparator may be provided in front of the NAND gate 20 in the circuit so that the comparator determines whether or not the above-described threshold is exceeded.

As described above, according to the present invention, the motor is forced to stop rotating after a lapse of time set by a timer even when a malfunction develops in the motor current detecting circuit. Thus, idling of the clutch and associated clutch noise are avoided, and power loss does not occur in the motor.

We claim:

1. A motor driven antenna for automobiles comprising:

a vertical driving means for driving a rod antenna of said motor driven antenna in a vertical direction;

a motor for driving said vertical driving means;

a positive temperature coefficient resistor provided in series with said motor for sensing motor current;

a power transistor provided in series with said motor for turning said motor ON or OFF in response to an input trigger pulse;

a timer which sets a time equal to an amount required for said rod antenna to be fully extended from its minimum length plus a predetermined additional time;

a relay circuit for controlling the direction of current of said motor, said relay circuit comprising:

a relay which is only energized during said time set by said timer after a power switch of an automobile radio changes from OFF to ON; and relay contact means for controlling direction of current to said motor such that current is supplied to said motor to cause said motor to drive said vertical driving means in an antenna extending direction only when said relay is energized; and a control circuit for supplying said input trigger pulse to said power transistor in response to said timer, said motor current sensed by said resistor and said power switch for said automobile radio such that said power transistor is turned ON when said power switch for said automobile radio changes from OFF to ON or ON to OFF, said power transistor is turned OFF when said timer reaches said set time and said power transistor is turned OFF when said sensed current exceeds predetermined value.

2. A motor driven antenna for automobiles according to claim 1, wherein said control circuit further operates in response to an ignition switch of said automobile such that said power transistor is turned OFF whenever said ignition switch is turned from OFF to ON to start said automobile.

3. A motor driven antenna for automobiles according to claim 1 further comprising a shock absorber means provided between said motor and said vertical driving means for absorbing mechanical shock between said vertical driving means and said motor.

4. A motor driven antenna for automobiles according to claim 6 wherein said shock absorbing means comprises a spring coupled between said motor and said vertical driving means.

5. A motor driven antenna for automobiles according to claim 6 wherein said shock absorbing means comprises a clutch provided between said motor and said vertical driving means.

* * * * *